Jan. 9, 1923.  S. KLIMCOVITZ.  1,441,859.
VEHICLE.
FILED DEC. 1, 1921.
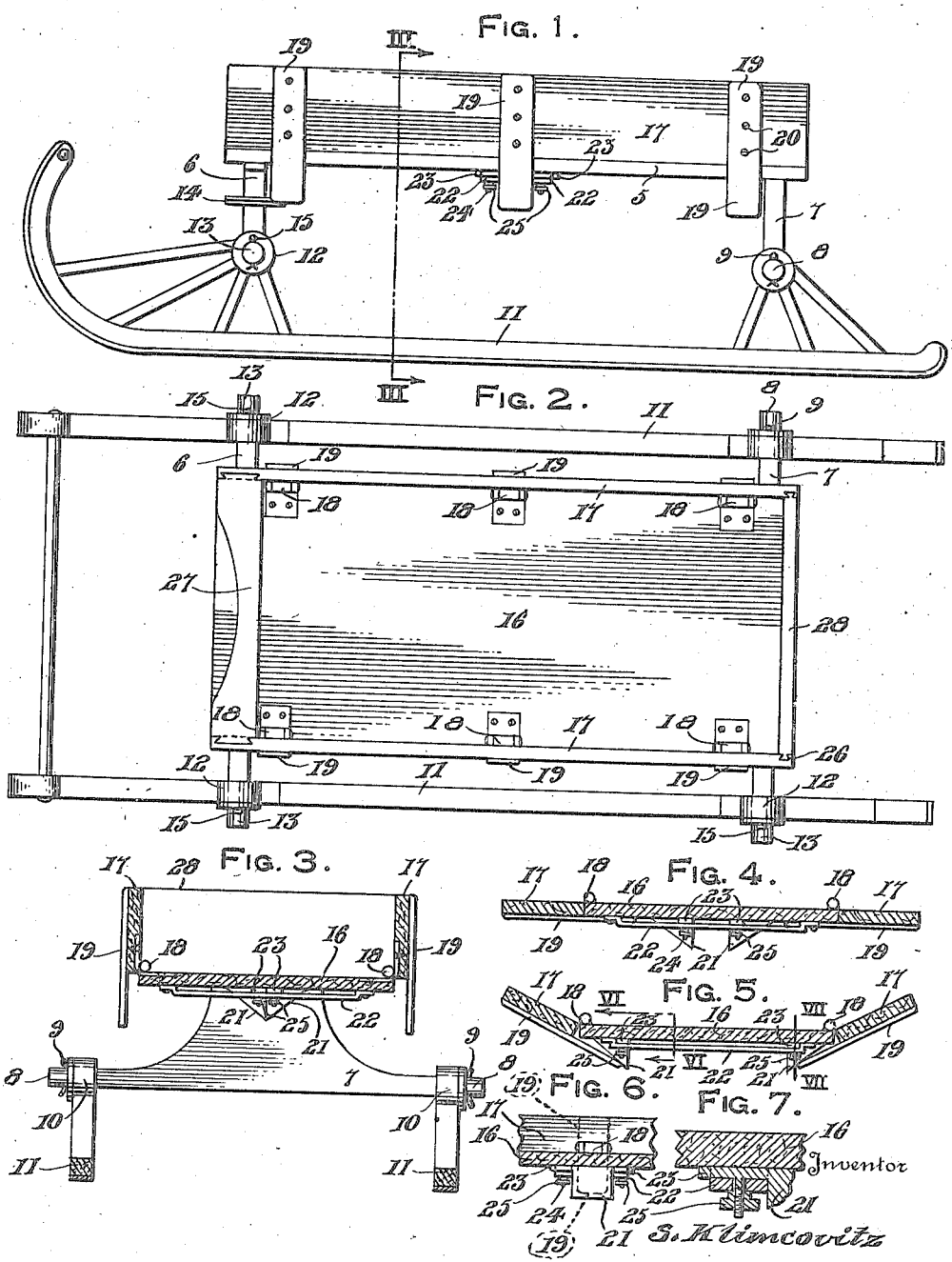

Patented Jan. 9, 1923.

1,441,859

UNITED STATES PATENT OFFICE.

STANLEY KLIMCOVITZ, OF JOHNSTOWN, PENNSYLVANIA.

VEHICLE.

Application filed December 1, 1921. Serial No. 519,188.

*To all whom it may concern:*

Be it known that I, STANLEY KLIMCOVITZ, a citizen of the United States of America, residing at Johnstown, in the county of Cambria and State of Pennsylvania, have invented certain new and useful Improvements in Vehicles, of which the following is a specification.

This invention relates to certain new and useful improvements in vehicles, and has particular reference to the improvement of the body construction of wagons or sleighs.

The primary object of the invention is to provide a wagon or other vehicle body with hinged side boards and improved means for adjusting said side boards at any desired angle relative to the bottom of the body for convenience in transporting loads of various kinds.

Other objects will appear as the nature of the invention is better understood and the same consists in the novel form, combination and arrangement of parts hereinafter more fully described in connection with the accompanying drawing and in which like characters of reference indicate like parts throughout the several views.

In the drawing,

Figure 1 is a side elevational view of a vehicle constructed in accordance with the present invention, Figure 2 is a top plan view thereof, Figure 3 is a transverse sectional view taken substantially upon line III—III of Figure 1, Figure 4 is a view somewhat similar to Figure 3 with parts removed and with the side boards shown in lowered position, Figure 5 is a view similar to Figure 4 with the side boards in partially lowered position, Figure 6 is a fragmentary sectional view taken upon line VI—VI of Figure 5 and Figure 7 is a view similar to Figure 6 taken upon line VII—VII of Figure 5.

Referring more in detail to the views, the invention may be embodied in a vehicle adapted to be converted for use as a wheeled vehicle or sleigh embodying a body 5 having transverse front and rear bolsters 6 and 7 respectively, the rear bolster 7 being provided with a pair of end axle portions 8 adapted to have the hubs of wheels secured thereon by means of cotter pins 9 or the like or to receive the hub members 10 rigid with the rear end of runners 11. The runners 11, when employed, also have front hub members rigid therewith as at 12 and a front axle 13 is connected with the front bolster by means of a fifth wheel construction 14 and adapted to have said hubs 12 fastened thereon by means of cotter pins 15. When supporting wheels are employed upon the rear axle, supporting wheels may also be employed upon the front axle 13 and the runners 11 removed from both sides of the device.

The present invention has particular reference to the improved construction of the body 5 which consists of a bottom 16 with side boards 17 hinged thereto along its side edges as at 18 for swinging outwardly and downwardly or vice versa so as to properly accommodate loads of various kinds, a receptacle like body being preferable for the hauling of dirt or the like as shown in Figure 3, while a flat bottom body is preferable in hauling lumber or the like as shown in Figure 4. With some materials to be handled, it is also desirable to have the side boards 17 adjusted at various angles between the horizontal and vertical as illustrated in Figure 5, and in order to accomplish this, the side boards 17 are provided with transverse bars 19 which are rigidly attached to the side bars as at 20 by means of screws or the like and which depend below the bottom 16. Three bars 19 are preferably provided for each side board 17 and means is attached to the under surface of the bottom 16 for cooperating with the depending ends of said bars 19 to support the side bars 17 at the desired position. This last named means preferably consists of a pair of blocks 21 arranged between each pair of bars 19 and adjustable transversely of the bottom 16 so as to be moved into and out of the path of the depending ends of the bars 19 and to form abutments when arranged in the path of said ends for limiting the downward swinging of the side boards 17, the outer edges of the blocks 21 being preferably inwardly inclined as shown and the lower ends of the arms 19 engaging these inclined edges.

The blocks or abutments 21 for the arms 19 are preferably slidably supported against the under surface of the bottom 16 for movement transversely of the latter by means of transverse guide plates 22 which have their ends fixed to said bottom and with their remaining portions in spaced relation to the latter, the blocks 21 being provided with oppositely directed side lugs 23 which rest upon the guide strips 22 between the latter and the under surface of the bottom 16, and one guide strip being provided at each side of each pair of blocks. For maintaining the blocks in adjusted position, the guide strips 22 are provided with longitudinal slots through which project depending bolts 24 as shown clearly in Figure 7, one bolt being provided rigid with and depending from each lug 24 of the blocks 21 and having a nut 25 threaded thereon to engage the under surface of the adjacent guide strip 22.

In the use of the device, the ends of the side boards 17 are preferably provided with dove-tail grooves 26 for reception of dove-tail tongues of corresponding size upon the ends of front and rear gates 27 and 28 respectively whereby the side boards 17 are held in a vertical position so as to form, in conjunction with the bottom 16, a box like body in which dirt or the like may be conveniently hauled. Should it be found desirable to partially lower the side boards 17 for presenting a wider surface upon which pipes or other articles may be hauled in considerable quantity, the front and rear gates 27 may be slid upwardly and thereby removed so as to leave the side boards 17 free to swing outwardly and downwardly until the lower ends of the arms 19 engage the abutments or blocks 21 which have been previously properly set by sliding the same toward the side edges of the bottom 16. This adjustment of the blocks is secured by tightening the nuts 25. In hauling lumber or similar material, it may be desirable to provide a wide flat surface with the side boards 17 horizontally disposed in line with the bottom 16 and by adjusting the abutments or blocks 21 inwardly toward the center of the bottom out of the path of the depending ends of the bars 19, as shown in Figure 4, said side boards may lower to a horizontal position. The lowering of the side boards 17 may be limited to a horizontal position by engagement of the adjacent edges of the same with the side edges of the bottom section 16 and engagement of the bars 19 with the under surface of the bottom 16. Although the abutment blocks 21 are only shown in Figure 1 in connection with the central bars 19, they may be duplicated for use with the other bars and as such duplication is obvious, illustration of the same is not made.

From the foregoing description, it is believed that the construction and operation, as well as the advantages of the present invention will be readily understood and appreciated by those skilled in the art.

Minor changes may be made in the invention without departing from the spirit and scope of the same as claimed.

What is claimed as new is:

1. A vehicle body including a flat bottom having side boards hinged to the opposite edges thereof so as to swing outwardly and downwardly, means to maintain the side boards vertically disposed including front and rear gates to form a box body, means to retain the side boards in outwardly swung position at any desired angle between the vertical and horizontal including depending bars fixed to said side boards and depending therefrom, abutment blocks for the depending bars mounted under and transversely movable of said bottom in the path of said arms, and means to limit the downward swinging movement of the side boards to horizontal position, said abutment blocks being movable inwardly toward each other out of the path of said arms for permitting swinging of the sides to a horizontal position.

2. A vehicle body including a flat bottom having side boards hinged to the opposite edges thereof so as to swing outwardly and downwardly, means to maintain the side boards vertically disposed including front and rear gates to form a box body, means to retain the side boards in outwardly swung position at any desired angle between the vertical and horizontal including depending bars fixed to said side boards and depending therefrom, abutment blocks for the depending bars mounted under and transversely movable of said bottom in the path of said arms, said abutment blocks having oppositely extending side lugs, guide plates fixed to the under surface of the bottom upon which said lugs slidably rest, and means associated with said guide strips to retain the blocks against movement relative thereto.

3. A vehicle body including a flat bottom having side boards hinged to the opposite edges thereof so as to swing outwardly and downwardly, means to maintain the side boards vertically disposed including front and rear gates to form a box body, means to retain the side boards in outwardly swung position at any desired angle between the vertical and horizontal including depending bars fixed to said side boards and depending therefrom, abutment blocks for the depending bars mounted under and transversely movable of said bottom in the path of said arms, said abutment blocks having oppositely extending side lugs, guide plates fixed to the under surface of the bottom upon which said lugs slidably rest, means associated with said guide strips to retain the blocks against movement relative thereto, said last named means including rigid depending bolts upon said lugs, said guide strips having longitudinal slots through which said bolts extend, and nuts threaded upon the ends of said bolts beneath and so as to engage the under surfaces of said guide strips.

In testimony whereof I affix my signature.

STANLEY KLIMCOVITZ.